Sept. 20, 1949.　　　G. W. SODERMAN　　　2,482,379
MATERIAL CUTTING APPARATUS
Filed March 26, 1948　　　5 Sheets-Sheet 1

INVENTOR
G.W. SODERMAN
BY
ATTORNEY

Sept. 20, 1949.　　　G. W. SODERMAN　　　2,482,379
MATERIAL CUTTING APPARATUS
Filed March 26, 1948　　　　　　　　　　5 Sheets-Sheet 2

INVENTOR
G. W. SODERMAN
BY
ATTORNEY

Sept. 20, 1949.    G. W. SODERMAN    2,482,379
MATERIAL CUTTING APPARATUS
Filed March 26, 1948    5 Sheets-Sheet 4

INVENTOR
G. W. SODERMAN
BY
W. C. Parmer
ATTORNEY

Sept. 20, 1949.     G. W. SODERMAN     2,482,379
MATERIAL CUTTING APPARATUS
Filed March 26, 1948     5 Sheets-Sheet 5
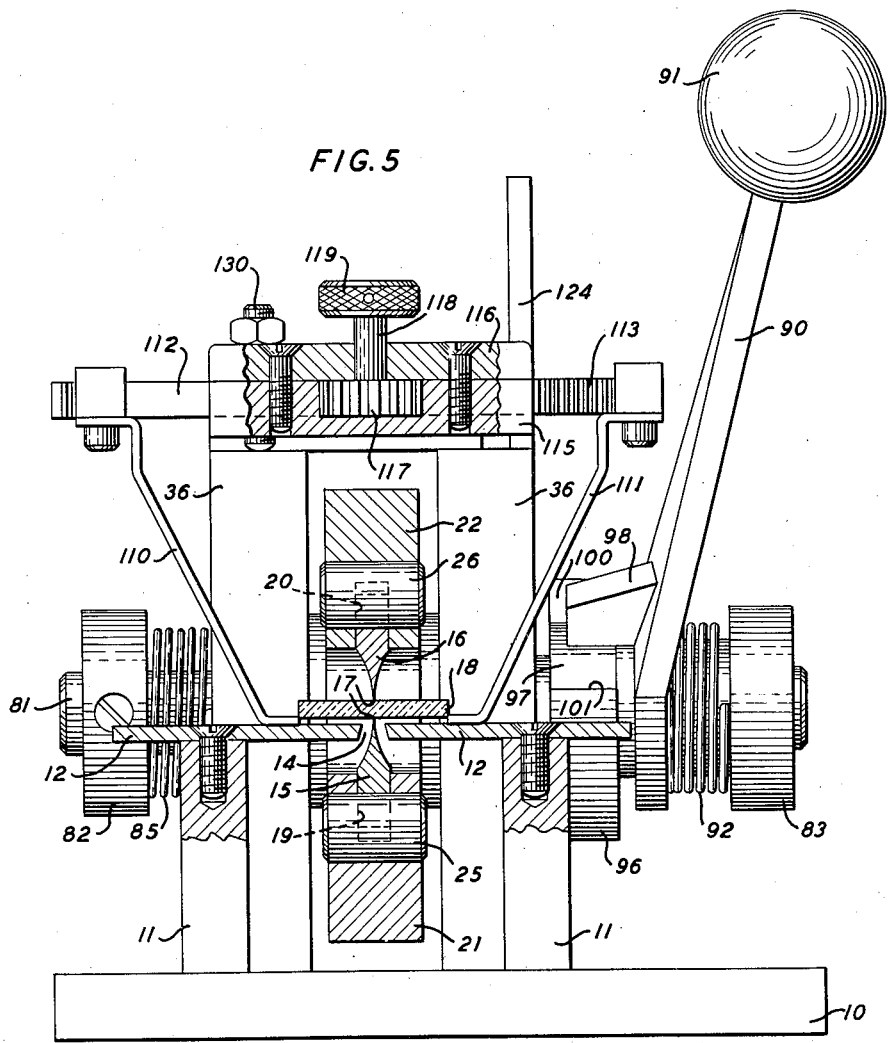
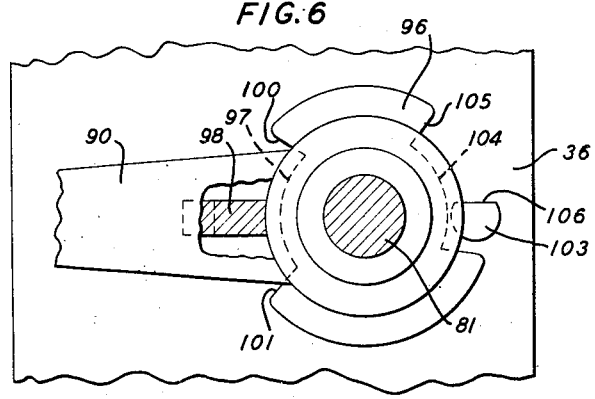
INVENTOR
G. W. SODERMAN
BY
W. C. Parnell
ATTORNEY Patented Sept. 20, 1949

2,482,379

UNITED STATES PATENT OFFICE 2,482,379

MATERIAL CUTTING APPARATUS

George W. Soderman, West Englewood, N. J., assignor to Western Electric Company, Incorporated, New York, N. Y., a corporation of New York Application March 26, 1948, Serial No. 17,262

12 Claims. (Cl. 125—23)

This invention relates to material cutting apparatus, and has for its object an apparatus which is simple in structure, readily actuable and highly efficient in cutting brittle materials such as crystals.

Synthetic crystals have been developed in the communication arts as a substitute for quartz crystals and although the synthetic crystals are similar in many ways to the quartz crystals, their differences in structure have necessitated the development of new machines or apparatus to process them in producing crystal plates or wafers of given contours from the mother stone. One of the steps of the process in the manufacture of synthetic crystals includes cutting the crystal plates or wafers into desired sizes.

In accordance with the aforementioned object, the invention comprises an apparatus for cutting brittle material such as crystals, the apparatus including a pair of blades having opposed and aligned edges supported by relatively movable elements. Means is provided to cause relative movement of the elements, first laterally to cause the blades to engage the material in a given plane, then longitudinally to cause the blades to scribe the opposing surfaces of the material and again laterally to cause the blades to cut the material in the said plane.

The cutting edges of the blades are serrated to facilitate scribing the material. Furthermore, the blades have floating connections with their respective supporting elements which constitute pin-like members about which the blades may rock whereby the cutting edges may find the planes of their respective surfaces of the material. The supporting elements are in the form of jaws mounted on a common pivot for movement about the pivot to position the blades with her cutting edges in engagement with the material. Elongate openings in the jaws or supporting elements allow longitudinal movement of the jaws in opposite directions to bring about scribing of the material by the blades, after which the jaws may again be moved laterally to cause the blades to cut the material. The material is initially supported on a table, located thereon by relatively movable locating members for centrally locating materials of various sizes on the table. The action of the blades is such that when moved into engagement with the material they will move the material free of the table for the scribing and cutting operations. The three main operating phases of the elements and blades are performed by actuation of a single cam through a resilient driving means backed up by a positive driving means if necessary for any of the operating phases.

Other objects and advantages will be apparent from the following detailed description when considered in conjunction with the accompanying drawings, wherein Fig. 1 is an elevational view of one side of the apparatus with the blades in the holding position in engagement with the material, portions of the apparatus in this figure being broken away;

Fig. 5 is a vertical sectional view of the apparatus taken substantially along the line 5—5 of Fig. 2; and Fig. 6 is a fragmentary sectional view of a portion of the apparatus.

Figure 1:
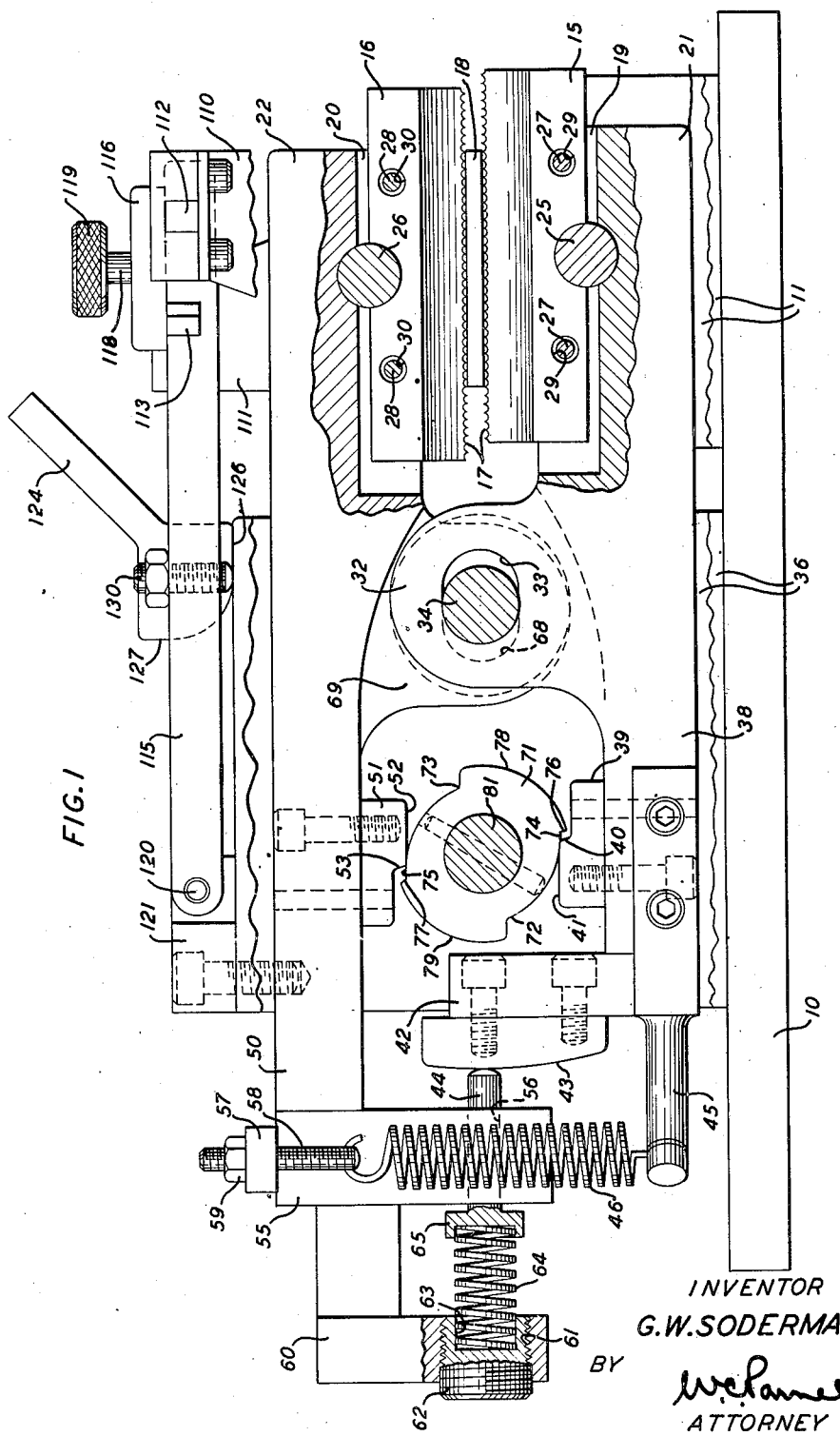

Referring now to the drawings, the apparatus includes a base member 10 having spaced uprights 11 which support a table 12. In the present embodiment of the invention, the table 12 is formed of two separate parts lying in a common plane and spaced from each other at their inner edges to provide an opening 14 for a lower cutting blade 15. The cutting blade 15 and its upper cutting blade 16 are identical in structure having serrated cutting edges 17 positioned opposite each other and in alignment whereby they may engage opposing sides of a material 18 in a common plane at right angles to the plane of the table 12. The blades 15 and 16 are movably disposed in notches 19 and 20 of their supporting elements 21 and 22. The notches 19 and 20 are of sufficient width to allow movement of the blades therein, the blades, however, being held in alignment with each other and permitted to move only about the centerlines of their pivots or rocking pins 25 and 26 which are mounted in apertures of the jaws 21 and 22. Limit pins or screws 27 and 28 carried by the jaws 21 and 22 extend through larger apertures 29 and 30 in the blades 15 and 16 to hold the blades in their notches, yet allow movement of the blades relative to their jaws 21 and 22.

The jaw 21 has a central portion 32 with an elongate opening 33 therein to receive a shaft or pivot rod 34. The shaft 34 is supported by spaced uprights 36 mounted on the base 10. Back of the central portion 32 of the supporting element or jaw 21 (to the left of Fig. 1) is a reduced portion 38 upon the inner surface of which is mounted a cam block 39 having a shoulder 40 and a raised portion 41. A vertical member 42, fixed to the end of the reduced portion 38 of the element 21, carries a pin block 43 to be engaged by a pin 44 during relative movement of the elements 21 and 22 about the shaft 34. An arm 45 is also mounted on the portion 38 of the element 21 to receive the adjacent end of a tension spring 46.

The supporting element 22 has a portion 50 which supports a cam block 51 on its under surface in general alignment with the cam block 39 and substantially identical in structure therewith, except that it is mounted in reverse with its high portion 52 nearest the shaft 34. A shoulder 53 of the cam block 51 faces the left end of the apparatus while the shoulder 40 of the cam block 39 faces the right end thereof. A vertical arm 55 is mounted on the outer end of the portion 50 of the element 22 and is apertured at 56 to receive the pin 44 for longitudinal movement therein. A bracket 57 mounted on the arm 55 carries an adjustable screw 58 which is connected to the upper end of the spring 46. Adjustment of the screw under the control of a nut 59 varies the force in the spring 46 to move the ends 38 and 50 of their elements 21 and 22 toward each other normally urging the blades 15 and 16 away from each other. An inverted L-shaped bracket 60 mounted on the arm 55 has a threaded aperture 61 to receive an adjusting screw 62 which has a pocket 63 therein to receive one end of a compression spring 64, the other end of the spring being supported in a recessed head 65 of the pin 44. The function of the spring 64 is to normally urge the elements 21 and 22 into their starting positions, the element 21 at its extreme right, and the element 22 at its extreme left, as shown in Fig. 1, the limits of the elements being under the control of the elongate apertures associated with the shaft 34. The elongate aperture 33 has been defined as being positioned in a central portion 32 of the element 21. A similar elongate aperture 68 is formed in a central portion 69 of the element 22 through which the shaft 34 extends.

Figure 3:
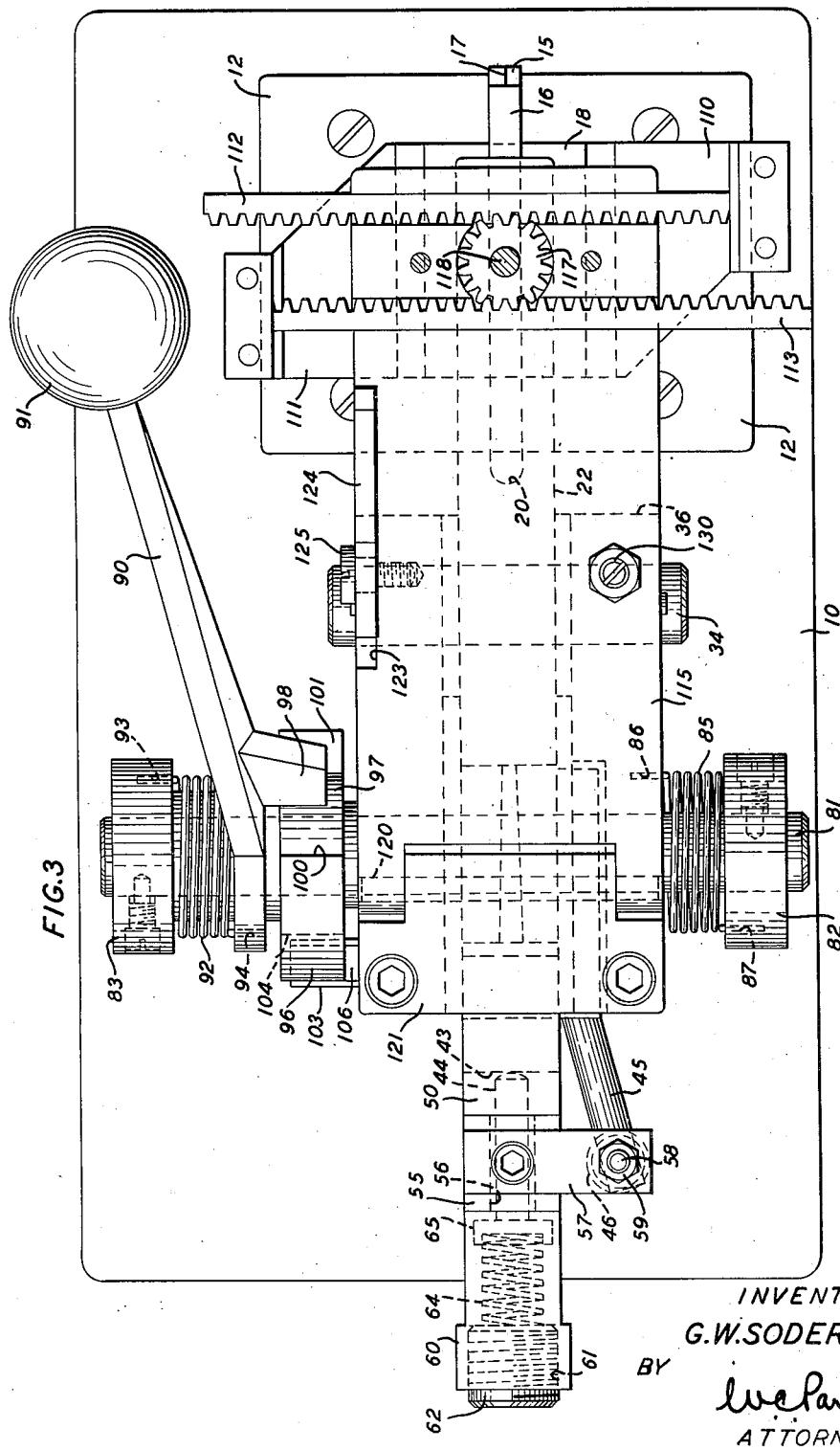
Fig. 3 is a top plan view of the apparatus, portions thereof being removed.
Figure 4:
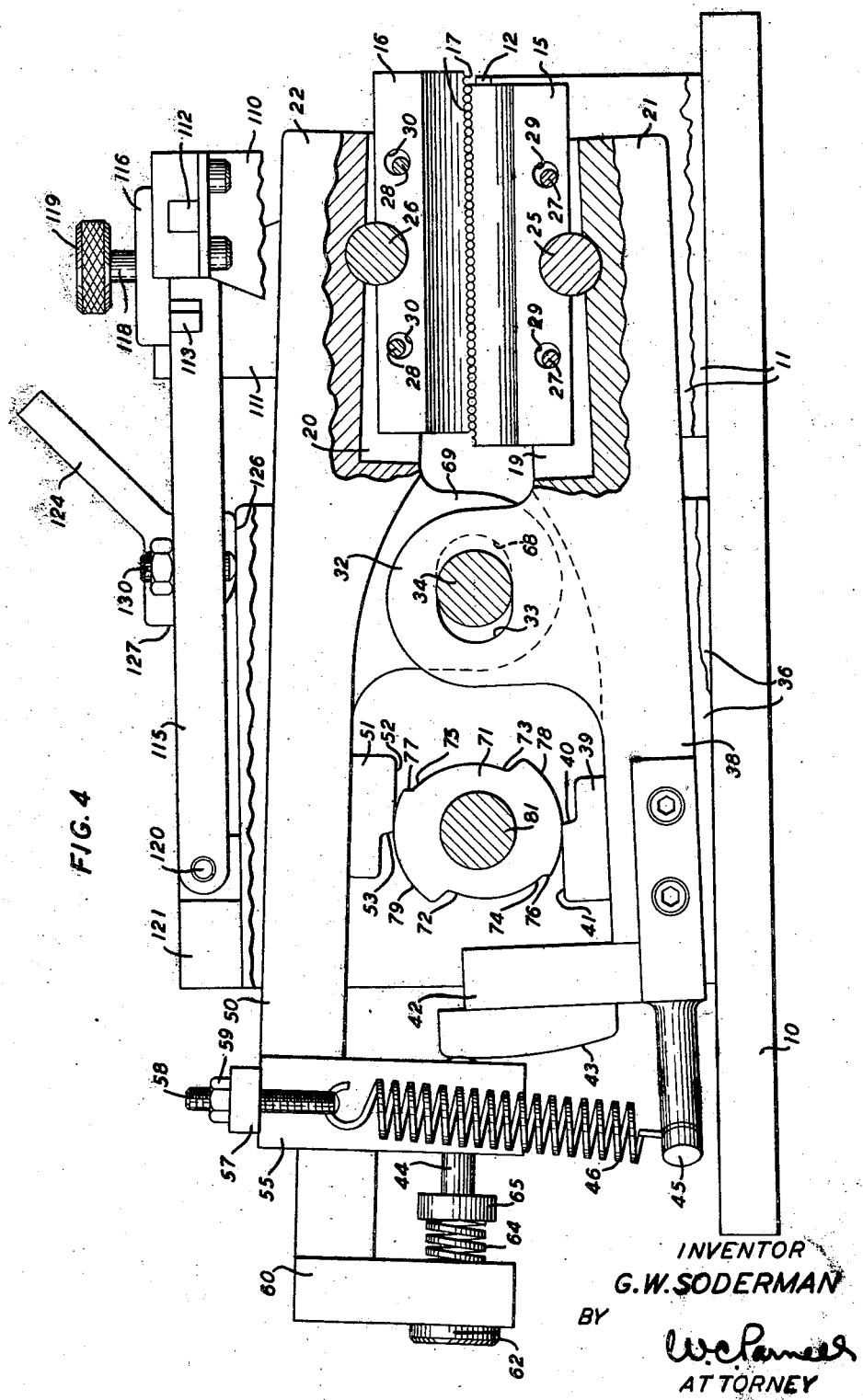
Fig. 4 is a side elevational view of the apparatus in the cutting position.

A cam 71 of the contour shown in Figs. 1 and 4 has diametrically opposed low portions 72 and 73 merging gradually into intermediate portions 74 and 75 where shoulders 76 and 77 separate the intermediate portions 74 and 75 from their respective high portions 78 and 79 respectively. The cam 71 is interposed between the cam blocks 39 and 51 where it is fixedly mounted on a cam shaft 81 which extends laterally through suitable bearings in the vertical members 36 and has collars 82 and 83 fixedly mounted on the outer ends thereof (Figs. 3 and 5). A torsional spring 85 disposed concentric with the shaft 81 is interposed between the collar 82 and the adjacent vertical member 36. The inner end of the spring extends into an aperture 86 in the member 36 while the outer end thereof extends into an aperture 87 of the collar 82. In this manner, the spring 85 is connected through the collar 82 to the shaft 81, its purpose being to hold the shaft 81 in its normal position and to return the shaft to its normal position after the apparatus has been operated to cause cutting of material.

A rotatable member or hand lever 90, having a ball-like hand grip 91 on its outer end is mounted on the cam shaft 81 for rotation relative thereto. A torsional spring 92, much stronger than the spring 85, is disposed concentric with the cam shaft 81 intermediate the collar 83 and the lever 90 and has its ends connected respectively thereto. One end of the spring is disposed in an aperture 93 of the collar 83 while the other end of the spring is disposed in an aperture 94 of the lever 90. The function of the spring 92 is to operate the cam 71 to perform its three functions, as will hereinafter be described. If, however, conditions should arise wherein the force of the spring 92 during actuation of the lever 90 should not be sufficient to rotate the cam shaft 81 to bring about the various functions of the cam, a positive means is provided to connect the lever 90 directly with the cam shaft. This means includes an intermediate collar 96 fixedly mounted on the cam shaft 81 and having a notch 97 therein to receive a laterally projecting finger 98 of the lever 90. When the apparatus is in normal position, the finger 98 will be positioned adjacent a shoulder 100 of the notch 97 and would not engage the opposite shoulder 101 unless the material being cut requires more than the force supplied by the spring 92. In this instance, the finger 98 will engage the shoulder 101 completing a positive connection between the lever 90 and the shaft 81 through the collar 96. A stop pin 103 carried by the adjacent vertical member 36 is positioned within another notch 104 of the collar 96, a shoulder 105 of the notch 104 engaging a flat portion 106 of the pin 103 when the cam shaft 81 is in its normal position.

Figure 2:
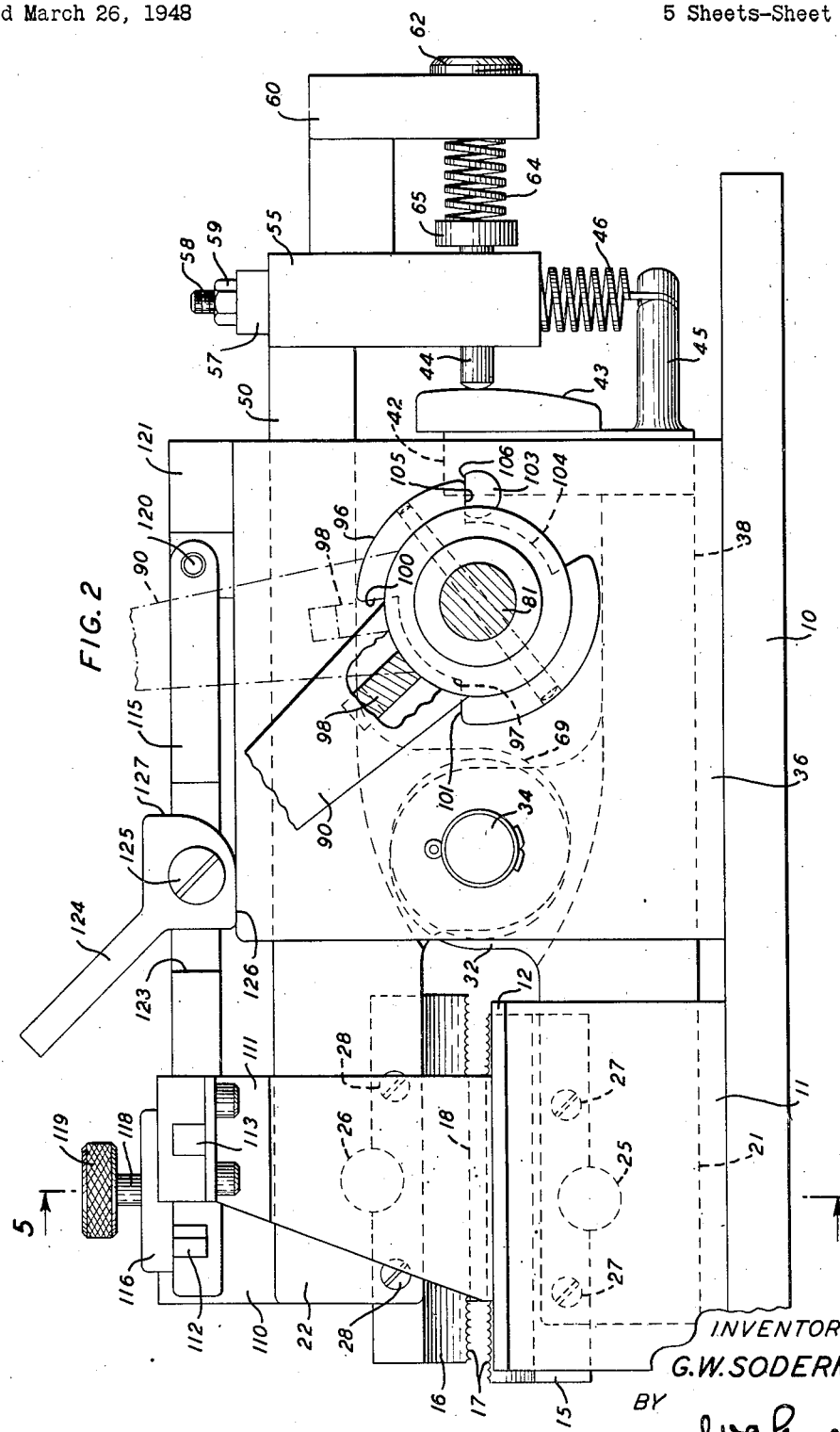
Fig. 2 is an elevational view of the other side of the apparatus.

A locating mechanism is provided to centrally locate materials of various sizes or widths on the table 12. This mechanism includes locating fingers 110 and 111 extending downwardly from their respective racks 112 and 113 to positions adjacent the table 12 as illustrated in Fig. 5. The racks 112 and 113 are supported for longitudinal movement relative to each other in grooves of a supporting frame 115 extending over the vertical members 36 and the table 12. The racks are held against displacement in their grooves by a cover 116. A gear 117 interposed between the racks 112 and 113 and interengaging the teeth of the racks is mounted on a shaft 118 which extends vertically through a bearing-like aperture in the cover 116 where a hand wheel 119 is mounted on the upper end thereof. Through this mechanism, it is apparent that rotation of the shaft 118 with the gear 117 in one direction, will cause movement of the racks 112 and 113 to move the locating fingers 110 and 111 toward each other while rotation of the shaft with the gear in the opposite direction will cause the racks to move the locating fingers away from each other. These movements of the locating fingers are identical at all times to centrally locate an article or material to be cut relative to the blades 15 and 16. The supporting frame 115 extends laterally to a position above the cam shaft 81 where it is pivotally mounted at 120 to a portion 121 fixedly mounted on the upper ends of the vertical members 36. A notch 123 is formed in one side of the supporting frame 115 to receive a cam lever 124 pivotally mounted at 125 and having a low portion 126 to rest upon the adjacent vertical member 36, as shown in Fig. 2 to position the locating mechanism adjacent the table 12; a high portion 127 of the cam lever functioning when moved into engagement with the upper surface of the adjacent vertical member 36 to move the supporting frame with the fingers 110 and 111 away from the table 12. An adjustable stop 130, in the form of a screw disposed in a threaded aperture in the supporting frame 115 engages the other vertical member 36 (Figs. 1 and 5), to control the positions of the locating fingers 110 and 111 above the table 12.

Operation

When the apparatus is in its normal open position, the cam 71 is located with respect to the cam blocks 39 and 51 whereby the high portions 41 and 52 of the cam blocks will engage the low portions 72 and 73 of the cam. The hand lever 90 is held in its normal position to locate the cam 71 in the position described by the force of the spring 85. The force of the spring 64 is distributed between the elements 21 and 22 to normally hold them in their extreme positions limited by the elongate apertures 33 and 68 in the central portions 32 and 69 thereof.

With the apparatus in its normal position for cutting materials or articles of a given width, one of the articles is placed on the table 12 after which the locating mechanism is actuated through rotation of the hand wheel 119, rotating the gear 117 to simultaneously move the racks 112 and 113 until the locating fingers 110 and 111 are moved into position to engage the article loosely. The locating fingers are in position to centrally locate articles of this particular width relative to the blades 15 and 16 whereby the blades will cut the articles along their centerlines. The positions of the locating fingers relative to the table 12 may be varied by adjusting the screw 130.

The operator then places the material or article 18 on the table 12 between the ends of the locating fingers 110 and 111, after which the hand lever 90 is rotated from the broken line position (Fig. 2) toward the solid line position, shown in this figure. During the first portion of the movement of the hand lever, the spring 92 will be rotated with the collar 83, rotating the cam shaft 81 from its normal position with the low portions 72 and 73 of the cam engaging the high portions 41 and 52 of the cam blocks until the cam has reached the position shown in Fig. 1 where the intermediate cam portions 74 and 75 engage the cam blocks. During this first phase of the operating cycle of the apparatus, the elements 21 and 22 are rocked about the shaft 34 bringing the blades 15 and 16 into gripping engagement with the article 18 and moving the article 18 free of the table 12 as illustrated in Fig. 5. Further movement of the hand lever 90 in the same direction will transfer a force through the spring 92, the collar 83 and the cam shaft 81 to move the shoulders 76 and 77 of the cam against the shoulders 40 and 53 of the cam blocks 39 and 51 and thus cause longitudinal movement of the elements 21 and 22 with their blades 15 and 16 in opposite directions until they have reached their limits in these directions controlled by their respective elongate apertures 33 and 68. During this relative longitudinal movement of the blades 15 and 16, the serrated cutting edges 17 thereof will scribe the opposing surfaces of the material in a given plane.

Continued movement of the hand lever 90 in the same direction increases the force of the spring 92 to rotate the cam shaft 81 with the cam 71 into the position shown in Fig. 4 resulting in further lateral movement of the blades 15 and 16 through lateral or rocking movement of the elements 21 and 22 to cut the material 18 in two along the plane where it was previously scribed.

During the operating cycle of the apparatus, the blades 15 and 16, although held with their cutting edges in alignment with each other, are free to rock about the pins 25 and 26 to engage the article 18 for the full length or width thereof. This condition is carried out throughout the operation of the apparatus during which time the blades 15 and 16 maintain their positions relative to each other although the elements 21 and 22 supporting the blades are rocked about the shaft 34.

When the material 18 has been cut, the operator may allow the hand lever 90 to return to its normal position through the force of the spring 85, the spring 46 maintaining close engagement of the cam blocks 39 and 51 with the cam 71 at all times, and the spring 64 returning the elements 21 and 22 to their normal positions as the cam 71 returns to its normal position. This operation may be repeated to successively cut brittle material or articles placed singly on the table 12. The actuation of the hand lever 90 in one direction, causes three operating phases including first the lateral movement of the blades and elements to bring the blades into engagement with the material, then movement of the elements and blades longitudinally to scribe the material in a given plane on opposing faces of the material, and finally additional lateral movement of the blades and elements to cut through the material.

The apparatus is constructed whereby the force originating in the hand lever is transmitted to the cam 71 through a resilient means, namely, the spring 92. Therefore, the resilient or cushion-like force of the spring 92 operates the blades through their three movements to cut the material. This is important in that the material being cut is of a highly brittle nature and it has been determined that less damage may be caused to the material, particularly during the first two steps of the cutting process, namely, positioning of the blades in engagement with material and moving the blades longitudinally relative thereto to scribe the material. In some instances, however, particularly with thicker materials, it has been determined that a positive or rigid connection between the actuating lever 90 and the cam 71 is essential to bring about the final step of the cutting operation. This is accomplished through the aid of the collar 86 which is fixed to the cam shaft 81 and notched to receive the projecting finger 98 of the hand lever 90 against the shoulder 101 to positively move or rotate the cam into its final position shown in Fig. 4, should the force created in the spring 92 not be sufficient to accomplish this result.

If, at any time, irregular articles are to be cut by the apparatus, the locating mechanism may be moved out of locating position by rotating the cam lever 124 clockwise (Fig. 2) until its high portion 127 rests upon the upper surface of its respective vertical member 36 to rotate the supporting frame 115 about its pivot 120, positioning the locating finger 110 and 111 out of the way about the table 12.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for cutting brittle material, a pair of jaws, means to support the jaws for limited longitudinal movement relative to each other, a pair of blades pivotally mounted on the jaws and having opposed and aligned serrated cutting edges, means for supporting material to be cut between the blades, actuable mechanism for closing the jaws and moving them longitudinally in opposite directions to move the cutting edges obliquely with respect to the surfaces of the material, an operating handle and a resilient connection between the handle and the jaw actuating mechanism.

2. In an apparatus for cutting brittle material, a pair of blades having opposed and aligned edges, relatively movable elements to support the blades, and means to cause relative movements of the elements first laterally to cause the blades to engage the material in a given plane, then longitudinally to cause the blades to scribe the opposing surfaces of the material and again laterally to cause the blades to cut the material in the said plane.

3. In an apparatus for cutting brittle material, a pair of blades having opposed and aligned edges, relatively movable elements to support the blades, floating connections between the blades and their supporting elements whereby the blades may move relative to the elements for their edges to engage opposing surfaces of the material, and means to cause relative movements of the elements first laterally to cause the blades to engage the material in a given plane, then longitudinally to cause the blades to scribe the opposing surfaces of the material and again laterally to cause the blades to cut the material in the said plane.

4. In an apparatus for cutting brittle material, a pair of blades having opposed and aligned edges, relatively movable elements to support the blades, a table to support the material between the blades, locating members movable relative to each other and the blades to locate materials of various sizes singly on the table relative to the blades, and means to cause relative movements of the elements first laterally to cause the blades to engage the material in a given plane, then longitudinally to cause the blades to scribe the opposing surfaces of the material and again laterally to cause the blades to cut the material in the said plane.

5. In an apparatus for cutting brittle material, a pair of blades having opposed and aligned edges, relatively movable elements to support the blades, a table, to support the material between the blades, slotted to receive one of the blades, and means to cause relative movements of the elements first laterally to cause the blades to engage the material in a given plane and lift it from the table, then longitudinally to cause the blades to scribe the opposing surfaces of the material and again laterally to cause the blades to cut the material in the said plane.

6. In an apparatus for cutting brittle material, a pair of blades having opposed and aligned edges, relatively movable elements to support the blades, a table to support the material betwen the blades, locating members movable relative to each other and the blades to locate materials of various sizes singly on the table relative to the blades, means to cause relative movements of the elements first laterally to cause the blades to engage the material in a given plane, then longitudinally to cause the blades to scribe the opposing surfaces of the material and again laterally to cause the blades to cut the material in the said plane, and means adjustable to vary the positions of the locating members relative to the table.

7. In an apparatus for cutting brittle material, a pair of blades having opposed and aligned edges, relatively movable elements to support the blades, a table to support the material between the blades, locating members movable relative to each other and the blades to locate materials of various sizes singly on the table relative to the blades, means to cause relative movements of the elements first laterally to cause the blades to engage the material in a given plane, then longitudinally to cause the blades to scribe the opposing surfaces of the material and again laterally to cause the blades to cut the material in the said plane, a pivotal support for the locating members, and means actuable to move the support about its pivot to move the locating members out of locating positions adjacent the table.

8. An apparatus for cutting brittle material comprising opposing elements with members intermediate their ends having substantially aligned elongate apertures therein, a fixed position shaft extending through the said apertures to thereby support the elements for pivotal and longitudinal movements relative to each other, cutting blades mounted on adjacent ends of the elements with the cutting edges of the blades extending toward and in alignment with each other, means normally active to hold the elements positioned with their blades spaced from each other to receive material therebetween, a table to support the material between the blades, means normally active to hold the elements in their extreme positions in given directions, and means actuable to rock the elements about the shaft to move the blades into engagement with the material, then move the elements longitudinally relative to each other to cause the blades to scribe the material and finally cause further pivotal movement of the elements to cause the blades to cut the material.

9. An apparatus for cutting brittle material comprising opposing elements with members intermediate their ends having substantially aligned elongate apertures therein, a fixed position shaft extending through the said apertures to thereby support the elements for pivotal and longitudinal movements relative to each other, cutting blades mounted on adjacent ends of the elements with the cutting edges of the blades extending toward and in alignment with each other, means normally active to hold the elements positioned with their blades spaced from each other to receive material therebetween, a table to support the material between the blades, means normally active to hold the elements in their extreme positions in given directions, and a cam movable from a starting position through an operating cycle to first rock the elements about the shaft to move the blades into engagement with the material, then move the elements longitudinally with their blades relative to each other to cause the blades to scribe opposing surfaces of the material in a given plane and finally rock the elements further about the shaft to cause the blades to cut the material in the said plane.

10. An apparatus for cutting brittle material comprising opposing elements with members intermediate their ends having substantially aligned elongate apertures therein, a fixed position shaft extending through the said apertures to thereby support the elements for pivotal and longitudinal movements relative to each other, cutting blades mounted on adjacent ends of the elements with the cutting edges of the blades extending toward and in alignment with each other, means normally active to hold the elements positioned with their blades spaced from each other to receive material therebetween, a table to support the material between the blades, means normally active to hold the elements in their extreme positions in given directions, a cam movable from a starting position through an operating cycle to first rock the elements about the shaft to move the blades into engagement with the material, then move the elements longitudinally with their blades relative to each other to cause the blades to scribe opposing surfaces of the material in a given plane and finally rock the elements further about the shaft to cause the blades to cut the material in the said plane, and resilient means to move the cam through the operating cycle.

11. An apparatus for cutting brittle material comprising opposing elements with members intermediate their ends having substantially aligned elongate apertures therein, a fixed position shaft extending through the said apertures to thereby support the elements for pivotal and longitudinal movements relative to each other, cutting blades mounted on adjacent ends of the elements with the cutting edges of the blades extending toward and in alignment with each other, means normally active to hold the elements positioned with their blades spaced from each other to receive material therebetween, a table to support the material between the blades, means normally active to hold the elements in their extreme positions in given directions, a cam movable from a starting position through an operating cycle to first rock the elements about the shaft to move the blades into engagement with the material, then move the elements longitudinally with their blades relative to each other to cause the blades to scribe opposing surfaces of the material in a given plane and finally rock the elements further about the shaft to cause the blades to cut the material in the said plane, and resilient means to return the cam to its normal position.

12. An apparatus for cutting brittle material comprising opposing elements with members intermediate their ends having substantially aligned elongate apertures therein, a fixed position shaft extending through the said apertures to thereby support the elements for pivotal and longitudinal movements relative to each other, cutting blades mounted on adjacent ends of the elements with the cutting edges of the blades extending toward and in alignment with each other, means normally active to hold the elements positioned with their blades spaced from each other to receive material therebetween, a table to support the material between the blades, means normally active to hold the elements in their extreme positions in given directions, a cam movable from a starting position through an operating cycle to first rock the elements about the shaft to move the blades into engagement with the material, then move the elements longitudinally with their blades relative to each other to cause the blades to scribe opposing surfaces of the material in a given plane and finally rock the elements further about the shaft to cause the blades to cut the material in the said plane, a rotatable member, resilient means interconnecting the rotatable member and the cam whereby rotation of the member may cause movement of the cam through an operating cycle, and rigid means to interconnect the rotatable member and the cam, should the force of the resilient means be insufficient for one of the phases of the operating cycle.

GEORGE W. SODERMAN.

REFERENCES CITED

The following references are of record in the file of this patent:

UNITED STATES PATENTS

| Number | Name | Date |
|---|---|---|
| 1,275,459 | Miller | Aug. 13, 1918 |
| 1,873,721 | Postley | Aug. 23, 1932 |
| 2,053,043 | Patterson | Sept. 1, 1936 |
| 2,289,985 | Nastri | July 14, 1942 |